US008626552B2

(12) United States Patent
Farrell et al.

(10) Patent No.: US 8,626,552 B2
(45) Date of Patent: Jan. 7, 2014

(54) QUORUM MANAGEMENT OF APPOINTMENT SCHEDULING

(75) Inventors: Colm Farrell, Dublin (IE); Liam Harpur, Dublin (IE); Patrick O'Sullivan, Dublin (IE); Fred Raguillat, Meath (IE); Daniel Terlizzi, Arezzo (IT); Carol S. Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 12/412,155

(22) Filed: Mar. 26, 2009

(65) Prior Publication Data

US 2010/0250321 A1    Sep. 30, 2010

(51) Int. Cl.
*G06Q 10/00* (2012.01)

(52) U.S. Cl.
USPC .................. 705/7.19; 705/7.16; 705/7.18

(58) Field of Classification Search
USPC ...................................... 705/7.16, 7.18, 7.19
See application file for complete search history.

(56) References Cited

U.S. PATENT DOCUMENTS

| | | | |
|---|---|---|---|
| 5,070,470 A | 12/1991 | Scully et al. | |
| 5,093,901 A | 3/1992 | Cree et al. | |
| 5,530,861 A | 6/1996 | Diamant et al. | |
| 6,016,478 A | 1/2000 | Zhang et al. | |
| 6,049,776 A | 4/2000 | Donnelly et al. | |
| 6,141,011 A | 10/2000 | Bodnar et al. | |
| 6,232,970 B1 | 5/2001 | Bodnar et al. | |
| 6,310,634 B1 | 10/2001 | Bodnar et al. | |
| 6,370,566 B2 | 4/2002 | Discolo et al. | |
| 6,389,454 B1 | 5/2002 | Ralston et al. | |
| 6,411,605 B1 | 6/2002 | Vance et al. | |
| 6,529,136 B2 * | 3/2003 | Cao et al. | 340/686.1 |
| 6,553,103 B1 | 4/2003 | Forlenza et al. | |
| 6,636,888 B1 | 10/2003 | Bookspan et al. | |
| 6,816,577 B2 | 11/2004 | Logan | |
| 6,836,537 B1 | 12/2004 | Zirngibl et al. | |
| 6,850,890 B1 | 2/2005 | Roff | |
| 6,898,569 B1 | 5/2005 | Bansal et al. | |
| 6,938,081 B1 | 8/2005 | Mir | |
| 6,957,393 B2 | 10/2005 | Fano et al. | |
| 7,076,043 B2 | 7/2006 | Curbow et al. | |
| 7,108,173 B1 | 9/2006 | Wang et al. | |
| 7,236,976 B2 | 6/2007 | Breitenbach et al. | |
| 7,256,816 B2 | 8/2007 | Profanchik et al. | |
| 7,272,575 B2 | 9/2007 | Vega | |
| 7,818,198 B2 * | 10/2010 | Masselle et al. | 705/7.18 |
| 2003/0149605 A1 * | 8/2003 | Cragun et al. | 705/8 |
| 2006/0045029 A1 * | 3/2006 | Ethier et al. | 370/260 |
| 2008/0040184 A1 * | 2/2008 | Cragun et al. | 705/8 |
| 2008/0177611 A1 * | 7/2008 | Sommers et al. | 705/8 |
| 2009/0125365 A1 * | 5/2009 | Masselle et al. | 705/9 |
| 2010/0189242 A1 * | 7/2010 | Jenkins et al. | 379/202.01 |

* cited by examiner

*Primary Examiner* — Johnna Loftis
(74) *Attorney, Agent, or Firm* — Thomas E. Lees, LLC

(57) ABSTRACT

A method, apparatus, system, and computer program product for managing scheduling of appointments with respect to a quorum requirement. The solution includes scheduling an appointment with each of a plurality of invitees, receiving one or more appointment management requests associated with the appointment from the invitees, the one or more appointment management requests including a change in the appointment, determining that a subset of the appointment management requests constitute a common request, determining that invitees that sent the common request satisfy the quorum constraint for the appointment, and implementing the common request in response to invitees that sent the common request satisfying the quorum constraint. The common request may include an acceptance, a cancellation notice, a cancellation request, and a re-scheduling request.

21 Claims, 6 Drawing Sheets

QUORUM MANAGEMENT OF APPOINTMENT SCHEDULING

BACKGROUND OF THE INVENTION

1. Field of the Invention

This invention relates to the quorum management of a calendaring and/or scheduling system.

2. Description of the Related Art

In a more connected world users are provided with tools for scheduling and managing of appointments such as meetings and other appointments. Inevitably, the productivity and success of the appointment or meeting depends on a specific set of one or more people attending the meeting. This particular set of people attending the appointment constitutes a quorum. Many appointments require a quorum to be present in order for the decisions made at the appointment or meeting to be binding and effective. Tools exist for inviting and coordinating of the scheduling of the appointment for a plurality of people using a variety of intercommunicating calendaring and scheduling tools. These existing tools permit appointment invitations to be sent to invitees and permit the invitees to accept the invitation, reject the invitation, propose a different appointment time and/or day, and the like.

Unfortunately, these tools do not permit the management of the appointment based on whether or not a quorum will be present at the appointment or meeting. Furthermore, these tools fail to allow members of the quorum to manage the scheduling, re-scheduling, or cancellation of the appointment. What is needed is a calendaring and scheduling tool that incorporates the existence of a quorum into the setting up the appointment as well as permitting the quorum to manage or adjust the appointment as needed.

SUMMARY OF THE INVENTION

Embodiments of the present invention have been developed to provide quorum management of appointment scheduling. The method in accordance with one embodiment includes scheduling an appointment with each of a plurality of invitees in response to an acceptance from one or more of the invitees, the one or more invitees that have accepted the appointment collectively satisfying a quorum constraint associated with the appointment. Next, the method receives one or more appointment management requests associated with the appointment from the invitees, the one or more appointment management requests comprising a change in the appointment. Then, the method determines that a subset of the appointment management requests comprise a common request. The method also determines that invitees that sent the common request satisfy the quorum constraint for the appointment. Finally, the method implements the common request in response to invitees that sent the common request satisfying the quorum constraint.

In certain embodiments, the method may determine that the subset of common appointment management requests are cancellation notices from appointment invitees that previously accepted the appointment, the cancellation notices notifying that a previous acceptance of the appointment by an invitee is revoked. Consequently, implementing the common request may include canceling the appointment for invitees that have accepted the appointment in response to invitees that sent the common request satisfying the quorum constraint.

The method may also determine that the subset of common appointment management requests are re-scheduling requests from appointment invitees that previously accepted the appointment, the re-scheduling requests notifying of a change to one of a time and place for the appointment. In addition, the determining that a subset of the appointment management requests comprise a common request also determines that the common request includes one of the same time change, the same place change, and a combination of time change and place change that is the same. In response, in certain embodiments implementing the common request further comprises re-scheduling the appointment for invitees that have accepted the appointment such that the re-scheduled appointment satisfies the common request from a set of invitees that satisfy the quorum constraint.

In certain embodiments, the method sends a modified appointment invitation to each invitee that has not sent a re-scheduling request, the modified appointment invitation corresponding to the re-scheduled appointment. The method may also receive one or more responses to the modified appointment invitations from each invitee that has not sent a re-scheduling request, and schedule the re-scheduled appointment with each invitee that responds to the modified appointment invitation in response to the invitees that sent the common request satisfying the quorum constraint.

In another embodiment, the method determines that the subset of common appointment management requests are cancellation requests, the cancellation requests requesting cancellation of the appointment and provides access to the cancellation requests to each of the appointment invitees. As a result, the implementation of the common request further comprises canceling the appointment for invitees that have accepted the appointment in response to invitees that sent the common request satisfying the quorum constraint.

In certain embodiments, the quorum constraint comprises one or more of: a minimum number of appointment attendees, a percentage of appointment attendees, a required appointment attendee, an appointment attendee designated to fill a specified role for the appointment, and an appointment attendee having a specified characteristic. In addition, the specified characteristic may comprise one or more of membership in a specified organization and a relationship to a specified individual in a social network. In certain embodiments, an appointment request is associated with an appointment policy. The appointment policy defines the quorum constraint for each appointment associated with the appointment policy.

Embodiments of the present invention may be implemented an apparatus, a computer program product, and a system executing the operations of the method described above. The apparatus and/or system implementation may include an invitation module, a receiving module, an acceptance module, a quorum constraint module, and a scheduling module. The apparatus and/or system implementation may also include a cancellation notice module, a cancellation module, a re-scheduling request module, and a cancellation request module. Each of these modules will be described in more detail below as example embodiments of the invention are described.

Reference throughout this specification to features, advantages, or similar language does not imply that all of the features and advantages that may be realized with an embodiment of the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
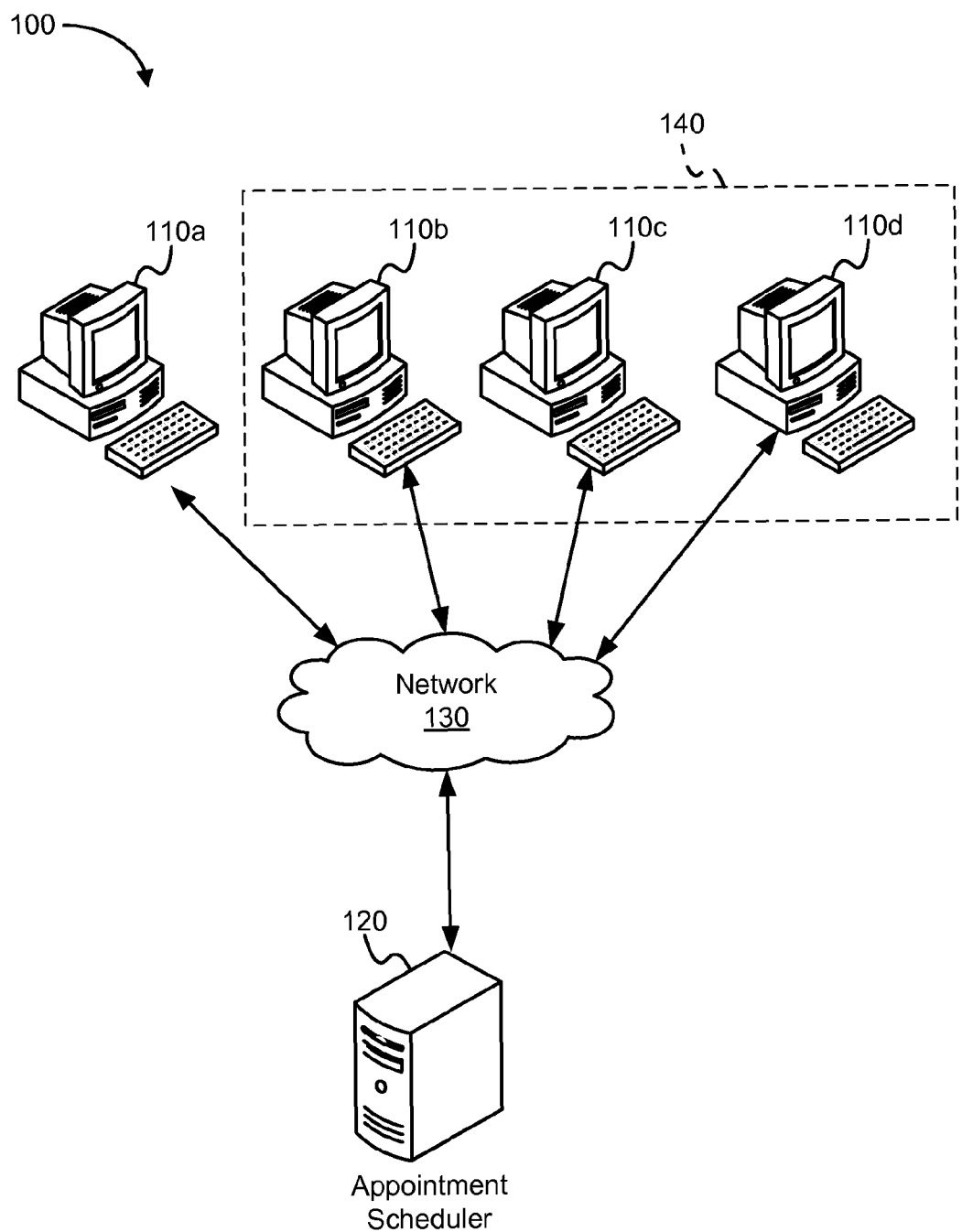
FIG. 1 is an illustration of one embodiment of a system for quorum management of appointment scheduling.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other tangible discrete components. A module may also be implemented in programmable hardware devices such as field programmable gate arrays, programmable array logic, programmable logic devices, computer processors, or the like.

Modules may also be implemented in software for execution by various types of calculating processors. An identified module of executable code may, for instance, comprise one or more physical or logical blocks of computer instructions which may, for instance, be organized as an object, procedure, or function. Nevertheless, the executable instructions of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, an embodiment of the present invention may be embodied as a method, apparatus, system, or computer program product. Accordingly, an embodiment of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, an embodiment of the present invention may take the form of a computer program product on a computer-readable storage medium having computer-readable program code embodied in the medium.

Any suitable computer usable or computer readable medium may be utilized. The computer-usable or computer-readable medium may be, for example but is not limited to, an electronic, magnetic, optical, electromagnetic, or semiconductor system, apparatus, device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, or transport the program for use by or in connection with the instruction execution system, apparatus, or device. The computer readable program code may be transmitted using any appropriate medium, including but not limited to the Internet, wire line, optical fiber cable, RF, etc.

Computer program code for carrying out operations of quorum management of appointment scheduling may be written in an object oriented programming language such as Java, Smalltalk, C++ or the like. However, the computer program code for carrying out operations of an embodiment of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 illustrates one embodiment of a system for quorum management of appointment scheduling. The system 100 may include a plurality of appointment invitees 110a in electronic communication with an appointment scheduler 120 across a network connection 130.

The appointment invitees 110a are any user capable of receiving an appointment invitation and accepting the appointment invitation from the appointment scheduler 120. An appointment invitation is an electronic message sent to an electronic device operated by the appointment invitee 110a. The appointment invitation is a request the appointment invitee 110a be present at an appointment at a particular time and place. The appointment invitation may be sent to a single appointment invitee 110a or to a plurality of appointment invitees 110a-d either directly or by way of one or more invitees 110 forwarding the appointment invitation to other invitees 110. The appointment invitation may include controls on how the appointment invitation may be distributed. The appointment may be a business meeting, an ad hoc meeting, an activity, a conference, a social event, a rally, an eating event, or the like. The appointment invitees 110a may be members of the same company, organization, government or corporate department, family, neighborhood, social network, or the like. Alternatively, or in another embodiment, the appointment invitees 110a are from different companies, organizations, government or corporate departments, social networks, and the like. The appointment invitees 110a may receive and accept the appointment invitations using a variety of computing devices including a desktop, a laptop, a personal computer, a workstation, a terminal, a PDA, a cell phone, and the like.

The user of the appointment scheduler 120 may comprise an appointment invitee 110a or another user tasked with setting up the appointment. The appointment scheduler 120 coordinates the identification of appointment invitees 110a-d, the distribution of the appointment invitations, the receipt of appointment invitation responses, and the scheduling of the appointment. In one embodiment, the appointment scheduler 120 comprises a computing device such as a server, a personal computer, a PDA, a desktop, a laptop, a workstation, a terminal, a cell phone, and the like. In certain embodiments, the appointment scheduler 120 reserves a time and one or more physical resources (such as a conference room, venue, or equipment to be used with the appointment) until the appointment is actually scheduled, re-scheduled, or canceled.

An appointment invitation response is an electronic message sent from or on behalf of one or more of the appointment invitees 110a-d as a result of the appointment invitation. Appointment invitation responses may be of various types each providing a different set of instructions for the appointment scheduler 120 relating to the appointment. In one embodiment, the appointment invitation response may comprise a response accepting the appointment invitation (also referred to herein as an "acceptance"), a cancellation notice, and an appointment management request.

An acceptance is an acknowledgement that the invitation was received and that, barring an unforeseen change, the invitee 110a-d will be in attendance at the appointment. A cancellation notice is a message from an invitee 110a-d canceling a previous acceptance that had accepted an appointment invitation. An appointment management request is a request to change the appointment attendance details or other attributes of the appointment and may include a re-scheduling request, a cancellation notice, a cancellation request, or the like. A re-scheduling request is a request from an invitee 110a-d to change scheduling details such as one or more of the time, place, or resources (such as a conference room, venue, A/V or other physical equipment) for the appointment. A cancellation request is a request from an invitee 110a-d to cancel the appointment.

It should be noted that a cancellation notice is different from a cancellation request. An invitee 110a-d can send a cancellation notice once an acceptance of an appointment invitation occurs. A cancellation notice is notice to the appointment scheduler 120 (and potentially to other invitees 110a-d) that the previous acceptance of the appointment is revoked. Thus, the invitee 110a-d does not plan to be present at the appointment. An invitee 110a-d can send a cancellation request at any time after an appointment invitation is received. The cancellation request does not require that an acceptance be made.

The appointment invitees 110a-d and the appointment scheduler 120 exchange appointment invitations, acceptances, cancellation notices, and appointment management request over an electronic network 130. The network 130 may comprise an interconnected set of computing devices such as a Local Area Network (LAN), Wide Area Network (WAN), or global communications network such as the internet. The network 130 may include one or more devices connected by one or more wired or wireless communication links such that the invitees 110a-d and appointment managers 120 can effectively communicate electronic messages.

In one embodiment, the appointment scheduler 120 schedules the appointment only if the invitees 110a-d that accept the appointment satisfy a quorum constraint. In one or more embodiments, the appointment scheduler 120 cancels the appointment if the invitees 110a-d that accept the appointment no longer satisfy a quorum constraint. For example, as a result of the cancellation notices received, the quorum constraint is no longer satisfied.

In addition or alternatively, in one embodiment, the appointment scheduler 120 implements an appointment management request if a subset of appointment management requests comprise a common request and the invitees that sent the common request satisfy the quorum constraint. An appointment management request comprises a requested change for the appointment.

A quorum constraint is a requirement associated with the appointment relating to the invitees that accept the appointment invitation. The quorum constraint defines a subset of the invitees 110$a$-$d$ required to accept the appointment invitation in order for the appointment to be scheduled and/or to take place. The quorum constraint defines the minimum number of attendees (invitees 110$a$-$d$ that accept the invitation and are expected to then attend) that should be present at the appointment in order for the matters on the agenda for the appointment to be acted upon. Typically, without a set of invitees 110$a$-$d$ (also referred to as attendees) that satisfy the quorum constraint present the appointment is ineffective and is of little consequence. Therefore, if the quorum constraint is not satisfied, the most effective alternative may be to cancel or re-schedule the appointment.

As used in the embodiments of the present invention, a variety of conditions may be used to define the quorum constraint. As used herein, each invitee is expected to attend the appointment, especially if the invitee has provided an acceptance. Therefore, invitee and attendee are used interchangeably. In certain embodiments, the quorum constraint comprises acceptance of the invitation by a minimum number of appointment invitees 110$a$-$d$, a predefined percentage of appointment invitees, a particular required invitee, an invitee designated to fill a specified role at the appointment (i.e. someone accepting to serve as chairperson or scribe or the like), an invitee having a specified characteristic, or the like. In certain embodiments, the specified characteristic comprises membership of the invitee in a specified organization and/or a relationship of the invitee to a specified individual in a social network. For example, the specified characteristic may be invitees that have a colleague relationship in a social network to a user organizing the appointment.

Referring back to FIG. 1, a representative example of a quorum constraint is illustrated by dashed box 140. In the example of FIG. 1, the quorum constraint 140 may be defined as three of the four invitees 110$a$-$d$ or a particular set of invitees such as invitee 110$b$ and invitee 110$d$. Management of appointments by way of a quorum constraint 140 either in scheduling, re-scheduling, or canceling of an appointment can save a significant amount of time by ensuring that the appointment is not scheduled unless the invitees 110 or group of invitees 110 with the needed information or authority have accepted the invitation. Or the appointment may be canceled if the quorum constraint is not satisfied. Furthermore, embodiments of the present invention, permit the members of the quorum, those invitees 110 that satisfy the quorum constraint, to control whether the appointment is canceled or re-scheduled.

Figure 2:
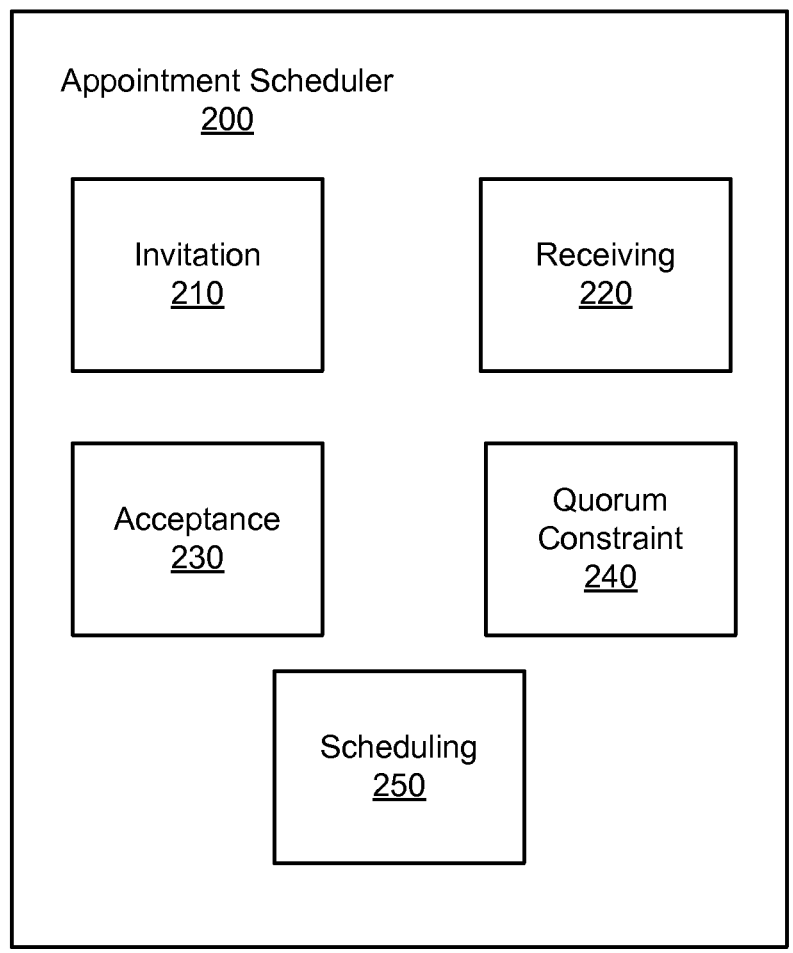
FIG. 2 is a block diagram illustrating one embodiment of an apparatus for quorum management of appointment scheduling.

FIG. 2 illustrates one embodiment of an apparatus for quorum management of appointment scheduling. The apparatus includes an appointment scheduler 200 comprising an invitation module 210, a receiving module 220, an acceptance module 230, a quorum constraint module 240, and a scheduling module 250.

The invitation module 210 sends an appointment invitation to each of a plurality of invitees 110$a$-$d$. A user operating the appointment scheduler 200 by way of a user interface may define the plurality of invitees 110$a$-$d$. The invitees 110 may be defined directly or indirectly such as by way of their membership in one or more groups and/or organizations. For example, a user may define the invitees 110 as all members of the accounting department of a company.

The receiving module 220 receives one or more responses to the appointment invitations from the invitees 110$a$-$d$. In certain embodiments, the receiving module 220 is further configured to receive responses that are not specifically responses to the appointment invitations. Responses received by the receiving module 220 may comprise appointment management requests. For example, the receiving module 220 may receive cancellation notices, re-scheduling requests, cancellation requests and the like. In one embodiment, the receiving module 220 communicates the responses to the acceptance module 230.

The acceptance module 230 determines if the responses received by the receiving module 220 are acceptances. If so, the acceptance module 230 communicates information about the acceptance to the quorum constraint module 240 and scheduling module 250. If not, the acceptance module 230 may send the response to the quorum constraint module 240.

The quorum constraint module 240, in one embodiment, determines that invitees 110 that have accepted the appointment invitation satisfy the quorum constraint. In certain embodiments, the quorum constraint module 240 determines the quorum constraint defined for the appointment associated with a particular acceptance. Next, the quorum constraint module 240 may tally the number of acceptances for the appointment in order to determine if the quorum constraint is satisfied. Alternatively, or in another embodiment, the quorum constraint module 240 may retrieve information about invitees that have sent acceptances and/or about previously received and stored appointment management requests in order to properly determine whether the quorum constraint is satisfied.

In another embodiment, the quorum constraint module 240 reviews responses that are not acceptances and determines if those responses require that the status of the invitation be changed in order to satisfy responses having common requests from invitees that collectively satisfy the quorum constraint. For example if a set of invitees that satisfy the quorum constraint have sent the quorum constraint module 240 a re-scheduling request the quorum constraint module 240 recognizes this is the case and communicates with the scheduling module 250 to implement the common re-scheduling request. In this manner, invitees 110 that satisfy the quorum constraint are able to collective manage the appointment to change the time and/or place and whether the appointment is canceled.

The scheduling module 250 schedules the appointment with each invitee 110. In certain embodiments, the scheduling module 250 schedules the appointment with each invitee 110 that sent an acceptance to the appointment scheduler 200. In certain embodiments, the scheduling module 250 schedules the appointment with each of the invitees 110 in response to the invitees that have accepted the invitation having satisfied the quorum constraint as indicated by the quorum constraint module 240. Scheduling the appointment may comprise converting a reservation of a time slot on an invitee's calendar from a reservation to a confirmed appointment.

Figure 3:
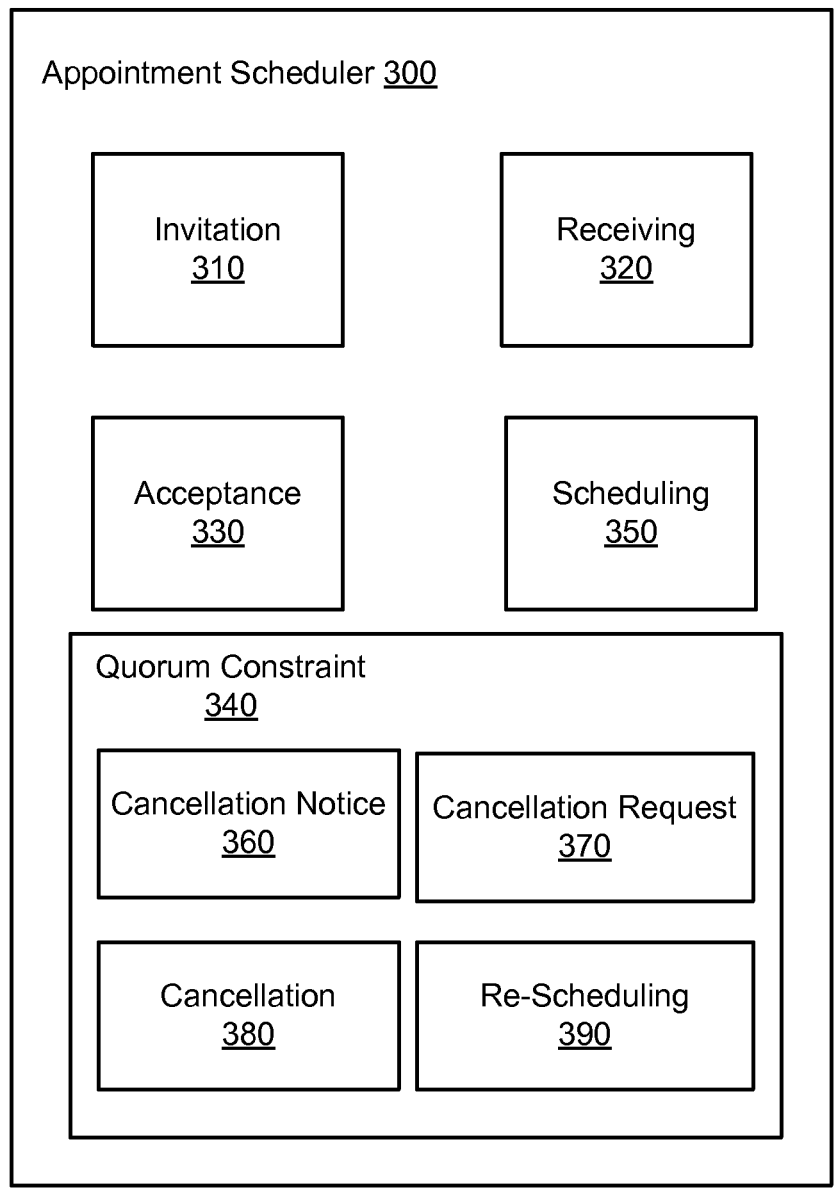
FIG. 3 is a block diagram illustrating one embodiment of an apparatus in more detail for quorum management of appointment scheduling.

FIG. 3 illustrates another embodiment of an apparatus for quorum management of appointment scheduling. The apparatus includes an appointment scheduler 300 comprising modules that are similar to the like numbered and named modules described in relation to the embodiment of FIG. 2 including an invitation module 310, a receiving module 320, an acceptance module 330, a quorum constraint module 340, and a scheduling module 350. Each of these modules may operate in substantially the same manner as those described above in relation to FIG. 2 with the differences described below.

The quorum constraint module 340 comprises a cancellation notice module 360, a cancellation request module 370, a cancellation module 380, and a re-scheduling module 390. The cancellation notice module 360 determines that one or more responses received by the receiving module 320 are cancellation notices from appointment invitees that have previously accepted the appointment invitation. The cancellation notices cancel a previous response accepting the appointment invitation. The cancellation notice module 360 communicates with the cancellation module 380 to handle the cancellation notice.

The cancellation module 380 cancels a previous acceptance of the appointment for each invitee 110 that has sent a cancellation notice. The cancellation of the appointment may involve the cancellation of a reserved time slot on an invitee's calendar. In certain embodiments, in response to a cancellation notice, the quorum constraint module 340 determines whether the invitees that have accepted the appointment invitation as a result of implementing the cancellation notice fail to satisfy the quorum constraint. If so, the cancellation module 380 cancels the appointment for each invitee that has accepted the appointment invitation in response to the unsatisfied quorum constraint. In this manner, an appointment for which the quorum constraint is no longer satisfied as a result of a cancellation notice is not scheduled.

The cancellation request module 370 determines that one or more responses received by the receiving module 320 are cancellation requests from appointment invitees. The cancellation requests propose a cancellation of the appointment associated with the appointment invitation. In response to the cancellation request, the quorum constraint module 340 determines that the invitees that have submitted cancellation requests for canceling the appointment satisfy the quorum constraint in response to a comparison of the cancellation requests. If the invitees that have sent cancellation requests satisfy the quorum constraint, the cancellation request module 370 signals the cancellation module 380 to cancel the appointment for each invitee 110. In this manner, the invitees that constitute the quorum (i.e. satisfy the quorum constraint) are also able to manage the keeping or canceling or re-scheduling of the appointment.

In certain embodiments, the cancellation request module 370 provides access to the fact that cancellation requests have been received to each of the appointment invitees. The cancellation request module 370 may provide access to the fact that cancellation requests have been made by one or more invitees through a variety of messaging mechanisms. For example, in one embodiment, the invitation module 310 may send each invitee a notice when a cancellation request is received. That notice may indicate who the invitee is that sent the cancellation request. Alternatively, the reserved time slot for the appointment may include an indicator that prompts a user to retrieve information that indicates that a cancellation request has been received. Once the invitees are informed of a cancellation request, this may prompt more cancellation requests. Alternatively, the information about the cancellation requests may prompt revocation of cancellation requests. Advantageously, the providing of this information about cancellation requests allows those invitees that constitute the quorum to manage the appointment even before the time the appointment is to be held.

The re-scheduling request module 390 determines that one or more responses received by the receiving module 320 are re-scheduling requests from appointment invitees that previously accepted the appointment invitation. The re-scheduling requests propose a change for an appointment associated with the appointment invitation.

In response to the re-scheduling request, the quorum constraint module 340 determines that the invitees that have submitted re-scheduling requests for re-scheduling the appointment have submitted a common re-scheduling request and that the invitees submitting common re-scheduling requests satisfy the quorum constraint in response to a comparison of the re-scheduling requests. A common re-scheduling request (also referred to herein as a "common request") is two or more re-scheduling requests which propose a same time change and/or a same place change and/or one or more appointment attribute changes that are the same.

If a common re-scheduling request is identified and the invitees that have sent re-scheduling requests satisfy the quorum constraint, the re-scheduling request module 390 signals the scheduling module 350 to schedule a re-scheduled appointment for each invitee 110 that sent a re-scheduling request. In addition, the cancellation module 380 is configured to cancel the appointment for invitees that have accepted the appointment invitation.

In certain embodiments, the quorum constraint module 340 signals the invitation module 310 to send a modified appointment invitation to each invitee that has not sent a common re-scheduling request. The modified appointment invitation may correspond to the re-scheduled appointment. In addition, the receiving module 320 may receive one or more responses to the modified appointment invitations from each invitee that has not sent a common re-scheduling request.

The scheduling module 350 may schedule the re-scheduled appointment with each invitee that responds to the modified appointment invitation in response to the invitees that have accepted the modified appointment invitation and submitted common re-scheduling requests satisfying the quorum constraint. In one embodiment, the scheduling module 350 is further configured to reserve a re-scheduled appointment for the invitees that sent common re-scheduling requests, the re-scheduled appointment corresponding to the common re-scheduling requests.

In this manner, the invitees that constitute the quorum (i.e. satisfy the quorum constraint) are also able to manage the keeping or canceling or re-scheduling of the appointment.

In certain embodiments, the re-scheduling request module 390 provides access to the fact that re-scheduling requests have been received to each of the appointment invitees. The re-scheduling request module 390 may provide access to the fact that re-scheduling requests have been made by one or more invitees through a variety of messaging mechanisms. In addition, the feedback facilitates re-scheduling requests that are in common. For example, in one embodiment, the invitation module 310 may send each invitee a notice when a re-scheduling request is received. That notice may indicate who the invitee is that sent the re-scheduling request. Alternatively, the reserved time slot for the appointment may include an indicator that prompts a user to retrieve information that indicates that a re-scheduling request has been received. Once the invitees are informed of a re-scheduling request, this may prompt more re-scheduling requests. Alternatively, the information about the re-scheduling requests may prompt revocation of re-scheduling requests. Advantageously, the providing of this information about re-scheduling requests allows those invitees that constitute the quorum to manage the appointment even before the time the appointment is to be held.

Figure 4:
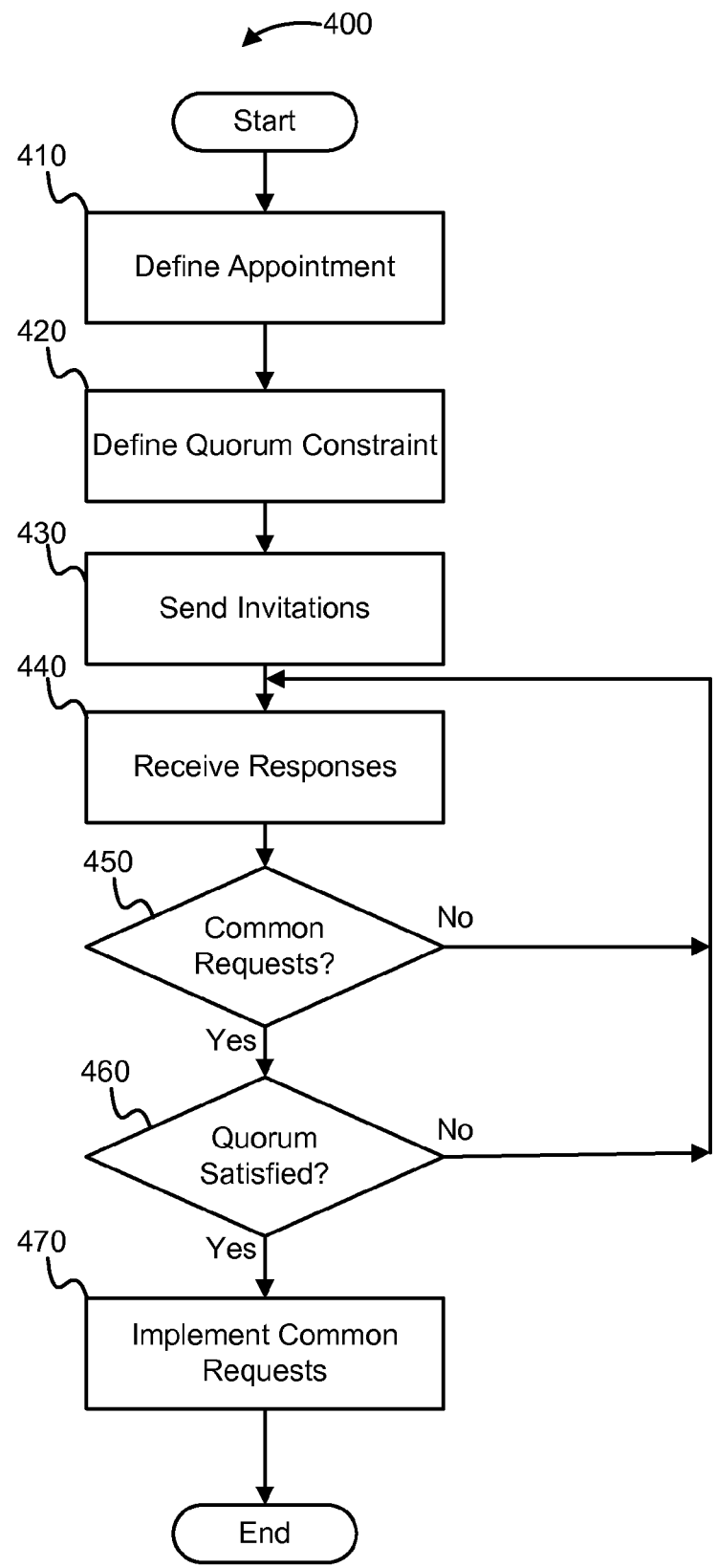
FIG. 4 is a schematic flow chart diagram illustrating one embodiment of a method for quorum management of appointment scheduling.

FIG. 4 illustrates one embodiment of a method for quorum management of appointment scheduling. The operations may be implemented by the executed operations of a computer program product. The method 400 begins and an operator of the appointment scheduler 120 defines the appointment and designates the invitees. Next, the operator defines a quorum using the appointment scheduler 200. In particular embodiments, the operator may define 420 a quorum constraint that quorum constraint module 240 references. Alternatively, or in addition, an appointment request from an operator to set up an appointment is associated with an appointment policy. The appointment policy may define the quorum constraint for each appointment associated with the appointment policy. In this manner, a company or other large organization can pre-define a plurality of appointment policies, each with a variety of different predefined quorum constraints. Consequently, the operator may not define the quorum constraint and may instead simply set up the appointment and the appointment policy is associated with the set up appointment by default. In addition, or alternatively, quorum constraints defined by appointment policies may be editable by certain users depending on user permissions. In this manner, the use of quorum constraints in defining appointments can be automatic and yet flexibly handle the needs of different organizations.

The invitation module 210 sends 430 the invitations. The receiving module 220 in cooperation with the acceptance module 230 and quorum constraint module 240 receives 440 responses such as acceptances, cancellation notices, and appointment management requests from the invitees.

The quorum constraint module 240 determines 450 whether a subset of the appointment management requests that include a common request. If a subset of common requests is determined, the quorum constraint module 240 determines 460 whether invitees 110 that sent the common request satisfy a quorum constraint for the appointment. If a subset of common requests is not determined, the appointment scheduler 200 may record the appointment management request for future reference and the receiving module 220 may await a next appointment management request.

If the quorum constraint module 240 determines 460 that invitees 110 that sent the common request satisfy a quorum constraint for the appointment, the invitation module 210, receiving module 220, acceptance module 230, quorum module 240 and scheduling module 250 cooperate as explained above to implement 470 the common request and the method 400 ends.

Figure 5:
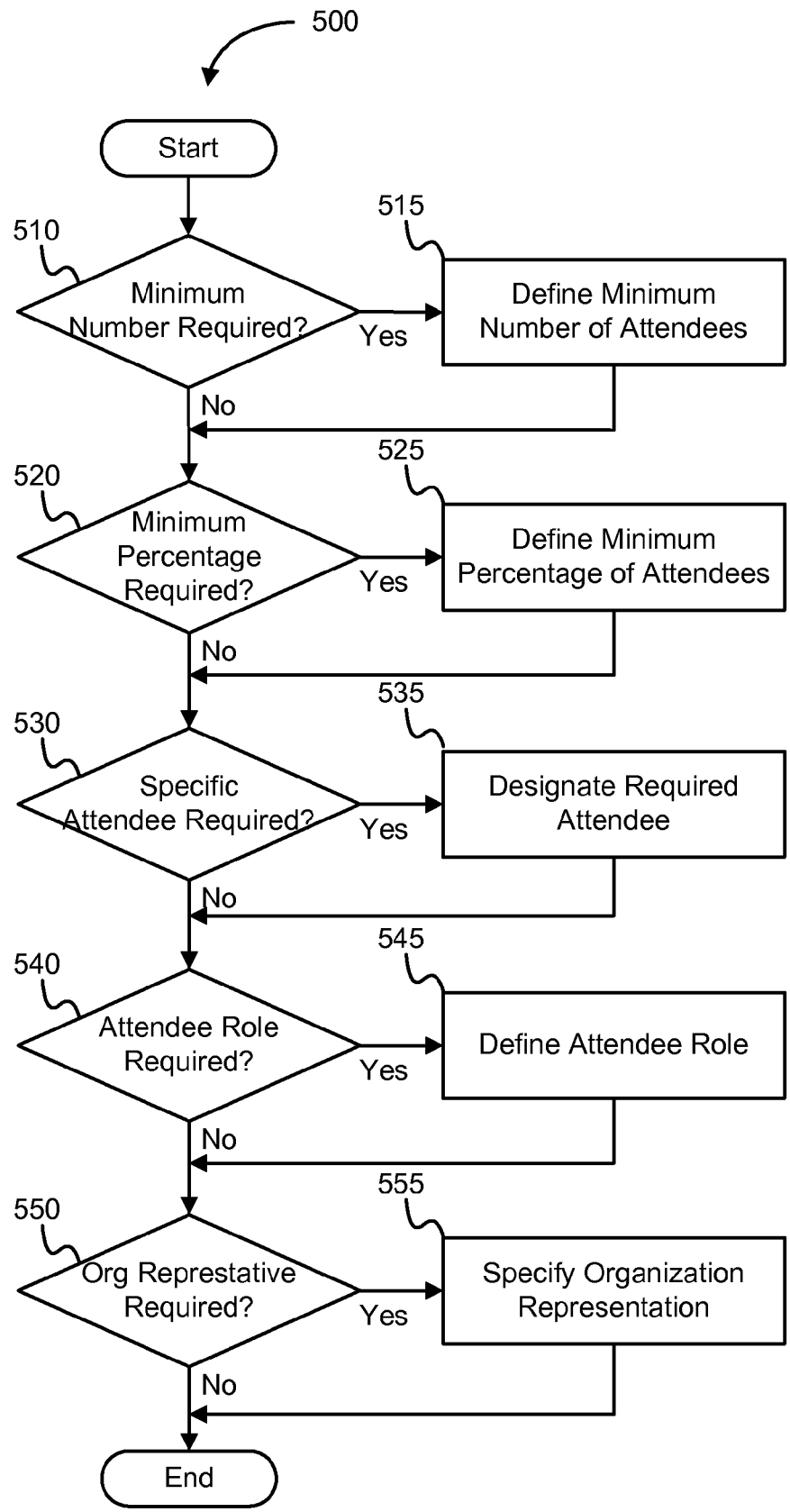
FIG. 5 is a schematic flow chart diagram illustrating one embodiment of a method for defining a quorum constraint for use in a method for quorum management of appointment scheduling.

FIG. 5 illustrates one embodiment of a method for defining a quorum constraint for use in a method for quorum management of appointment scheduling. The operations may be implemented by the executed operations of a computer program product. The method 500 begins and the appointment scheduler 200 presents the user with a series of conditions to be answered in defining the quorum constraint that will define how invitees will manage the appointment associated with this quorum constraint. In certain embodiments, only one of the conditions presented to the user as determinations in the embodiment of FIG. 5 can be used to define the quorum constraint. Alternatively, or in addition, a combination of criteria may be used to define the quorum constraint.

In one embodiment, the user determines 510 if the quorum constraint is to be defined by a minimum number of attendees. If so, the user supplies 515 the minimum number of attendees. If not, the user determines 520 if the quorum constraint is to be defined by a minimum percentage of attendees.

If so, the user supplies 525 the minimum percentage of attendees. If not, the user determines 530 if the quorum constraint is to be defined by a required specific attendee. If so, the user supplies 535 the required specific attendee. If not, the user determines 540 if the quorum constraint is to be defined by an invitee agreeing to take a designated attendee role (i.e. moderator or chairperson).

If so, the user supplies 545 the designated attendee role and the number of attendees required to accept that role. If not, the user determines 550 if the quorum constraint is to be defined by one or more particular organization representatives (i.e. department heads). If so, the user supplies 555 the one or more particular organization representatives and the number of particular organization representatives required. Once the conditions defining the quorum constraint are set, the method 500 ends.

Figure 6:
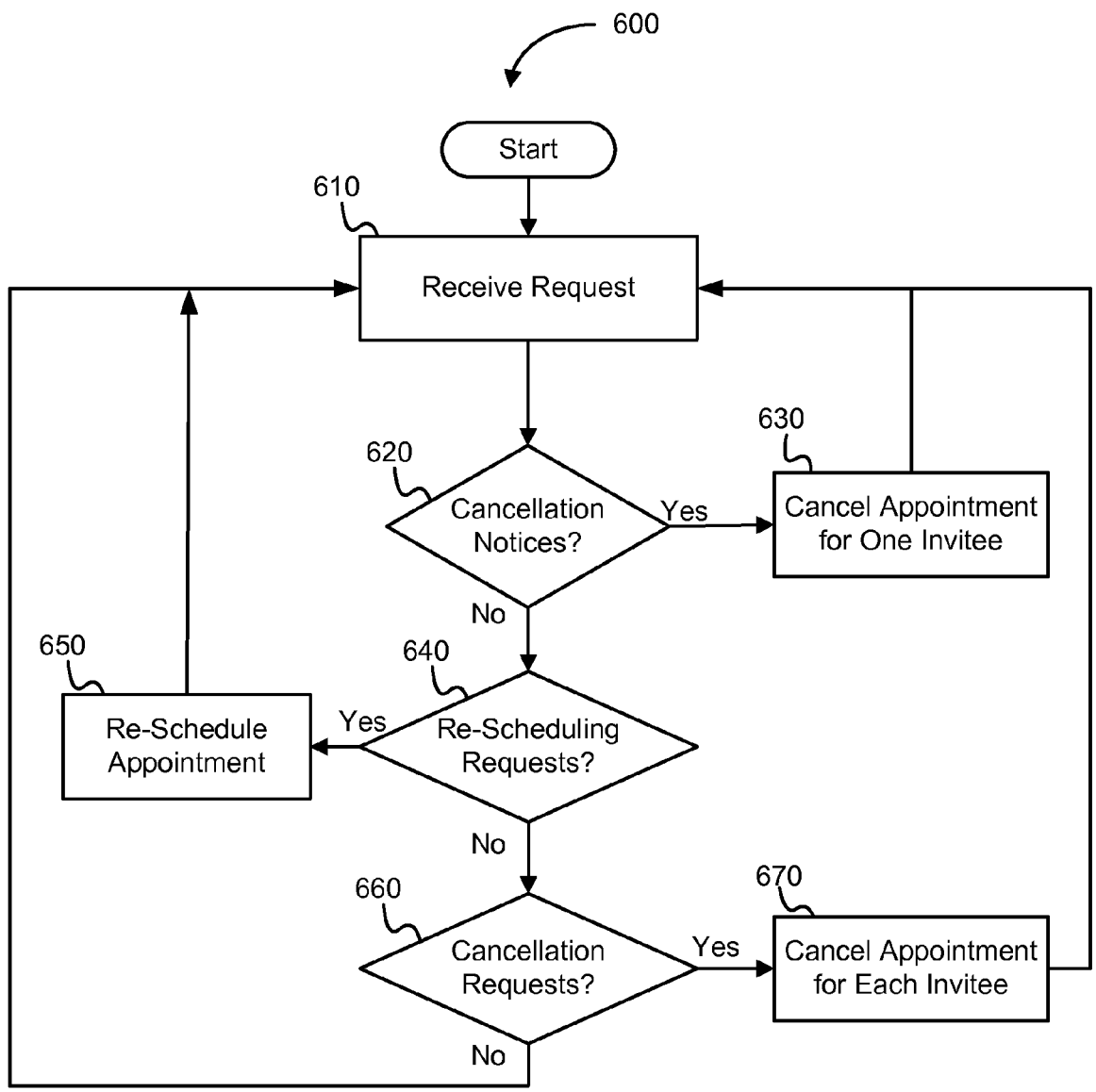
FIG. 6 is a schematic flow chart diagram illustrating one embodiment of a method for handling invitee requests in a method for quorum management of appointment scheduling.

FIG. 6 illustrates one embodiment of a method for quorum management of appointment scheduling. The operations may be implemented by the executed operations of a computer program product. The method 600 begins and the receiving module 320 receives 610 one or more appointment management requests including invitation acceptances, cancellation notices, re-scheduling requests, and cancellation requests from the invitees. Next, the cancellation notice module 360 determines 620 whether one or more appointment management requests received by the receiving module 320 are cancellation notices from appointment invitees that have previously accepted the appointment invitation. If so, the cancellation module 380 cancels 630 a previous acceptance of the appointment for each invitee 110 that has sent a cancellation notice. In addition, the quorum constraint module 340 determines whether the invitees that have accepted the appointment still satisfy the quorum constraint after implementing the appointment cancellations. If so, no appointment change is made. If not, the cancellation module 380 cancels the appointment to each invitee 110.

If the appointment management requests are not cancellation notices, the re-scheduling module 390 determines 640 whether one or more appointment management requests received by the receiving module 320 are re-scheduling requests from appointment invitees that previously accepted the appointment invitation. If so, the quorum constraint module 340 determines whether the invitees that have submitted re-scheduling requests for re-scheduling the appointment have submitted a common re-scheduling request and that the invitees submitting common re-scheduling requests satisfy the quorum constraint. If a common re-scheduling request is identified and the invitees submitting common re-scheduling requests satisfy the quorum constraint, the re-scheduling module 390 re-schedules 650 the appointment for invitees that have accepted the appointment such that the re-scheduled appointment satisfies the common re-scheduling request from a set of invitees that satisfy the quorum constraint.

If the appointment management requests are not re-scheduling requests, the cancellation request module 370 determines 660 whether one or more appointment management requests received by the receiving module 320 are cancellation requests from appointment invitees. If so, the quorum constraint module 340 determines whether the invitees that have submitted the cancellation requests satisfy the quorum constraint. If so, the cancellation module 380 cancels 670 the appointment for each invitee associated with the appointment. If not, the cancellation request is stored and the method 600 returns to receiving the next appointment management request.

What is claimed is:

1. A method for managing scheduling of appointments, the method comprising:

sending an appointment invitation to each of a plurality of invitees to request the scheduling of an appointment;

receiving a plurality of appointment management requests associated with the appointment after sending the appointment invitation, where at least one appointment management request comprises a request to change at least one of a time and a place for the appointment, wherein the appointment management request further includes a proposal for the requested change to the appointment;

determining, using a processor, whether a subset of the received appointment management requests comprise a common request to change at least one of a time and a place for the appointment to the proposed requested change;

determining, using a processor, whether invitees that sent the common request satisfy a quorum constraint for the appointment; and implementing the common request in response to invitees that sent the common request satisfying the quorum constraint.

2. The method of claim 1, further comprising, determining, using a processor, whether a subset of received appointment management requests are cancellation notices from appointment invitees that previously accepted the appointment, the cancellation notices notifying that a previous acceptance of the appointment by an invitee is revoked; and canceling the appointment for invitees that have accepted the appointment in response to the subset of received appointment management requests that are cancellation notices satisfying the quorum constraint.

3. The method of claim 1, further comprising, determining that the subset of received appointment management requests are re-scheduling requests from appointment invitees that previously accepted the appointment, the re-scheduling requests notifying of a change to one of a time and a place for the appointment; and wherein implementing the common request further comprises re-scheduling the appointment for invitees that have accepted the appointment.

4. The method of claim 3, further comprising:

sending a modified appointment invitation to each invitee that has not sent a re-scheduling request, the modified appointment invitation corresponding to the re-scheduled appointment;

receiving one or more responses to the modified appointment invitations from each invitee that has not sent a re-scheduling request; and scheduling the re-scheduled appointment with each invitee that responds to the modified appointment invitation in response to the invitees that sent the common request satisfying the quorum constraint.

5. The method of claim 1, further comprising, determining, using a processor, whether a subset of received appointment management requests are cancellation requests, the cancellation requests requesting cancellation of the appointment; and providing access to the cancellation requests to each of the appointment invitees;

wherein implementing the common request further comprises canceling the appointment for invitees that have accepted the appointment.

6. The method of claim 1, wherein the quorum constraint comprises one or more of: a minimum number of appointment attendees, a percentage of appointment attendees, a required appointment attendee, an appointment attendee designated to fill a specified role at the appointment, and an appointment attendee having a specified characteristic.

7. The method of claim 6, wherein the specified characteristic comprises one or more of: membership in a specified organization and a relationship to a specified individual in a social network.

8. An apparatus for managing scheduling of appointments, the apparatus comprising a processor coupled to memory, wherein the processor is programmed to manage scheduling of appointments by implementing:

an invitation module configured to send an appointment invitation to each of a plurality of invitees in response to an appointment request from a user, the appointment request indicating a quorum constraint defining a subset of the plurality of invitees required to accept the appointment invitation in order to schedule the appointment;

a receiving module configured to receive at least one response to the appointment invitations from the invitees;

an acceptance module configured to determine whether responses from invitees are responses accepting the appointment invitation;

a quorum constraint module configured to:

determine whether the invitees have submitted a common re-scheduling request that includes a proposal for a change to at least one of a time and a place for the appointment; and determine whether the invitees submitting the common re-scheduling request satisfy the quorum constraint; and a scheduling module configured to schedule the appointment with each invitee that sent a response accepting the appointment invitation in response to determining that the invitees that accepted the appointment invitations satisfy the quorum constraint and to re-schedule the appointment based upon the common rescheduling request and the proposed change if the common re-scheduling request satisfies the quorum constraint.

9. The apparatus of claim 8, further comprising, a cancellation notice module configured to determine that the one or more responses from invitees are cancellation notices from appointment invitees that previously accepted the appointment invitation, the cancellation notices cancelling a previous response accepting the appointment invitation; and a cancellation module configured to cancel the previous response accepting the appointment invitation for each invitee in response to each cancellation notice;

wherein the quorum constraint module is further configured to determine that invitees that have accepted the appointment invitations as a result of the cancellation notices fail to satisfy the quorum constraint in response to cancelling the previous response accepting the appointment invitation for each invitee; and wherein the cancellation module is further configured to cancel the appointment for invitees that have accepted the appointment invitations in response to the unsatisfied quorum constraint.

10. The apparatus of claim 8, further comprising, a re-scheduling request module configured to determine that the one or more responses from invitees are re-scheduling requests from appointment invitees that previously accepted the appointment invitation, the re-scheduling requests proposing a change for an appointment associated with the appointment invitation; and wherein the scheduling module is further configured to schedule a re-scheduled appointment with each invitee that sent a re-scheduling request in response the invitees that have submitted common re-scheduling requests for the re-scheduled appointment satisfying the quorum constraint; and a cancellation module configured to cancel the appointment for invitees that have accepted the appointment invitations in response to the invitees that have submitted common re-scheduling requests for a re-scheduled appointment satisfying the quorum constraint.

11. The apparatus of claim 10, wherein the invitation module is further configured to send a modified appointment invitation to each invitee that has not sent a common re-scheduling request, the modified appointment invitation corresponding to the re-scheduled appointment;

the receiving module is further configured to receive one or more responses to the modified appointment invitations from each invitee that has not sent a common re-scheduling request; and the scheduling module is further configured to schedule the re-scheduled appointment with each invitee that responds to the modified appointment invitation in response to the invitees that have accepted the modified appointment invitation and submitted common re-scheduling requests satisfying the quorum constraint.

12. The apparatus of claim 11, wherein the scheduling module is further configured to reserve a re-scheduled appointment for the invitees that sent common re-scheduling requests, the re-scheduled appointment corresponding to the common re-scheduling requests.

13. The apparatus of claim 10, wherein the re-scheduling request module is further configured to provide access to the re-scheduling requests to each of the appointment invitees.

14. The apparatus of claim 8, further comprising, a cancellation request module configured to determine that the one or more responses from invitees are cancellation requests from appointment invitees, the cancellation requests proposing a cancellation for an appointment associated with the appointment invitation, the cancellation request module further configured to provide access to the cancellation requests to each of the appointment invitees;

wherein the quorum constraint module is further configured to determine that the invitees that have submitted cancellation requests for canceling the appointment satisfy the quorum constraint in response to a comparison of the cancellation requests; and a cancellation module configured to cancel the appointment for each invitee in response to the invitees that have submitted cancellation requests satisfying the quorum constraint.

15. The apparatus of claim 8, wherein the quorum constraint comprises one or more of: a minimum number of appointment attendees, a percentage of appointment attendees, a required appointment attendee, an appointment attendee designated to fill a specified role at the appointment, and an appointment attendee having a specified characteristic.

16. The apparatus of claim 15, wherein the specified characteristic comprises one or more of membership in a specified organization and a relationship to a specified individual in a social network.

17. The apparatus of claim 8, wherein the appointment request is associated with an appointment policy, the appointment policy defining the quorum constraint for each appointment associated with the appointment policy.

18. A computer program product, comprising a non-transitory computer readable storage medium having a computer readable program code embodied therein, the computer readable program code adapted to be executed to implement a method for managing scheduling of appointments, the method comprising:

sending an appointment invitation to each of a plurality of invitees to request the scheduling of an appointment;

scheduling an appointment with each of a plurality of invitees in response to an acceptance from one or more of the invitees, the one or more invitees that have accepted the appointment collectively satisfying a quorum constrain associated with the appointment;

receiving at least one appointment management request associated with the appointment from the invitees, the at least one appointment management request comprising a request to change at least one of a time and a place for the appointment, wherein the appointment management request further includes a proposal for the requested change to the appointment;

providing access to the appointment management requests to each of the appointment invitees;

determining whether a subset of the appointment management requests comprise a common request to change the appointment to the proposed change to the appointment;

determining whether invitees that sent the common request satisfy the quorum constraint for the appointment to change at least one of a time and a place for the appointment; and implementing the common request in response to invitees that sent the common request satisfying the quorum constraint.

19. The computer program product of claim 18, further comprising, determining that the subset of common appointment management requests are re-scheduling requests from appointment invitees that previously accepted the appointment, the re-scheduling requests notifying of a change to one of a time and a place for the appointment; and wherein implementing the common request further comprises re-scheduling the appointment for invitees that have accepted the appointment such that the re-scheduled appointment satisfies the common request from a set of invitees that satisfy the quorum constraint.

20. The computer program product of claim 18, further comprising:

sending a modified appointment invitation to each invitee that has not sent a re-scheduling request, the modified appointment invitation corresponding to the re-scheduled appointment;

receiving one or more responses to the modified appointment invitations from each invitee that has not sent a re-scheduling request; and scheduling the re-scheduled appointment with each invitee that responds to the modified appointment invitation in response to the invitees that sent the common request satisfying the quorum constraint.

21. The computer program product of claim 18, further comprising, determining whether a subset of the received appointment management requests are cancellation requests, the cancellation requests requesting cancellation of the appointment;

providing access to the cancellation requests to each of the appointment invitees; and wherein implementing the common request further comprises canceling the appointment for invitees that have accepted the appointment in response to invitees that sent the common request satisfying the quorum constraint.

\* \* \* \* \*